June 16, 1925.

J. S. OSTROM

MOLDING MACHINE FOR SHAPING PLASTIC MATERIAL

Filed Sept. 22, 1921    4 Sheets-Sheet 1

1,542,348

WITNESS
H. Sherburne

INVENTOR
John S. Ostrom.
BY
White Prost Evans
his ATTORNEYS

Patented June 16, 1925.

1,542,348

UNITED STATES PATENT OFFICE.

JOHN S. OSTROM, OF SAN FRANCISCO, CALIFORNIA, ASSIGNOR TO HENRY RHINE & COMPANY, OF SAN FRANCISCO, CALIFORNIA, A FIRM COMPOSED OF HENRY RHINE AND HERMAN MOSS.

MOLDING MACHINE FOR SHAPING PLASTIC MATERIAL.

Application filed September 22, 1921. Serial No. 502,332.

*To all whom it may concern:*

Be it known that I, JOHN S. OSTROM, a citizen of the United States, and a resident of the city and county of San Francisco, State of California, have invented a new and useful Molding Machine for Shaping Plastic Material, of which the following is a specification.

The present invention relates to a machine for shaping plastic candy into a string, though it is not limited to use on candy stock only.

Great quantities of candy are molded into small cubical blocks called caramels which are automatically wrapped in suitable machines to which the stock is fed in a string of a given cross-section. In preparing the stock it is ordinarily rolled into flat sheets of prescribed thickness and this is subdivided into strings of given width which is then fed to the wrapping machine and there cut into blocks.

It is one of the objects of my invention to construct an improved molding machine capable of use in such processes, that serves to shape the material to be formed into a flat strip, which may later be operated upon in any desired manner.

In such machines a shaping roller is used, which operates in conjunction with a table or another roller to define a passageway for the stock. The separation between the cooperating parts is adjustable to take care of different thicknesses of stock. It is another object of my invention to provide an improved guide leading to this passageway, whereby the material may be efficiently guided irrespective of the extent of opening between the rollers.

The invention possesses other objects and features of advantage, some of which, with the foregoing, will be made manifest in the following description of the preferred form of the invention, which is illustrated in the drawings accompanying and forming part of the specification. It is to be understood that it is not intended to limit the invention to the embodiment shown by the said drawings and description, as variations may be adopted within the scope of the invention as set forth in the claims.

Fig. 5 is a perspective of the feed box.

The machine of the invention embodies preferably a pair of rotary shaping members arranged with their axes parallel and with their peripheral or cylindrical faces in spaced relation, means being provided for varying the spacing.

Means are included for maintaining a constant space or width irrespective of the variation in the other dimension.

The variation of the spacing is accomplished by parallel movement of the rotary members relatively. Feed and discharge means are combined with the shaping members and are provided with adjustable side walls complementary to the shiftable and to the non-shifting rotary members to maintain continuity of stock guide irrespective of the variation of the effective shaping means.

Figure 3:
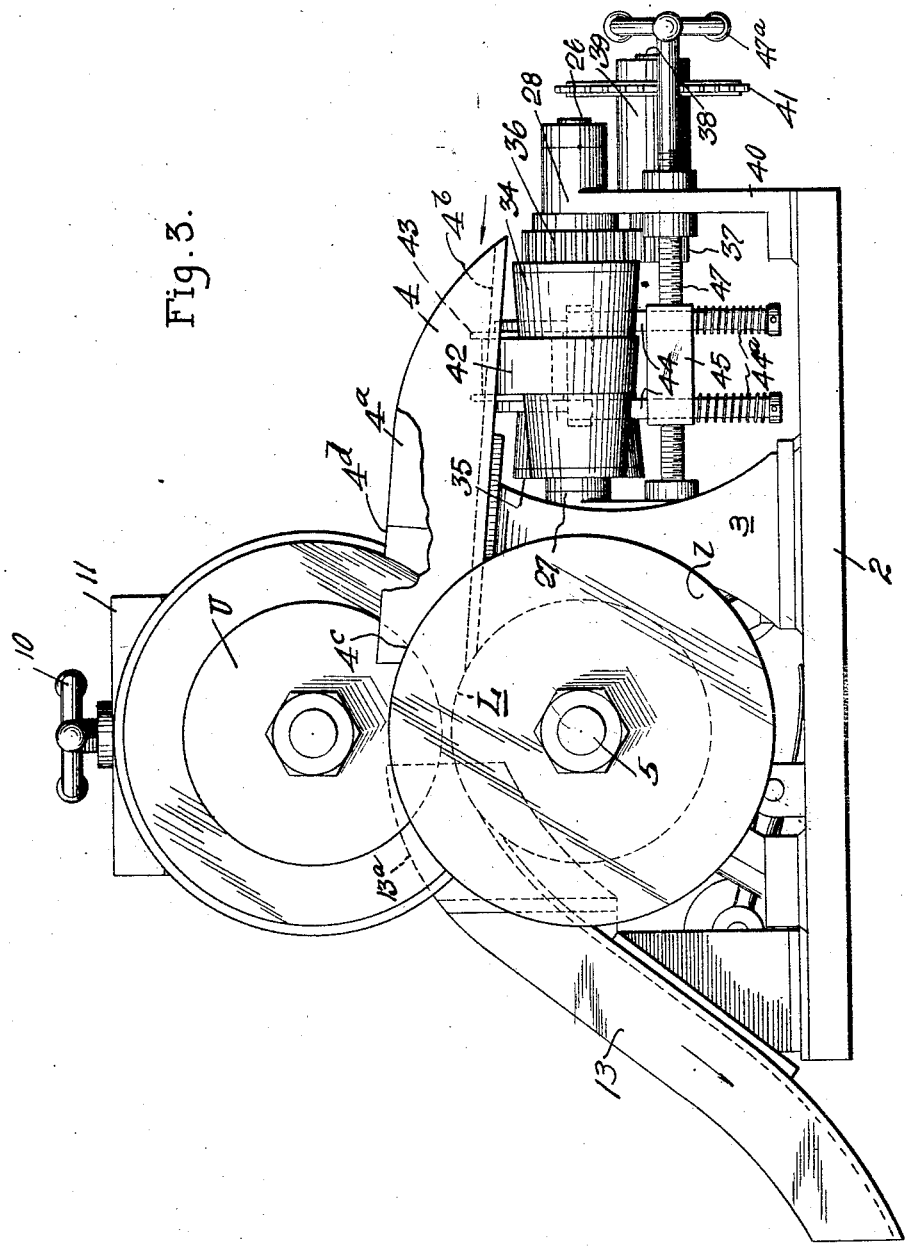
Fig. 3 is a front elevation.
Figure 4:
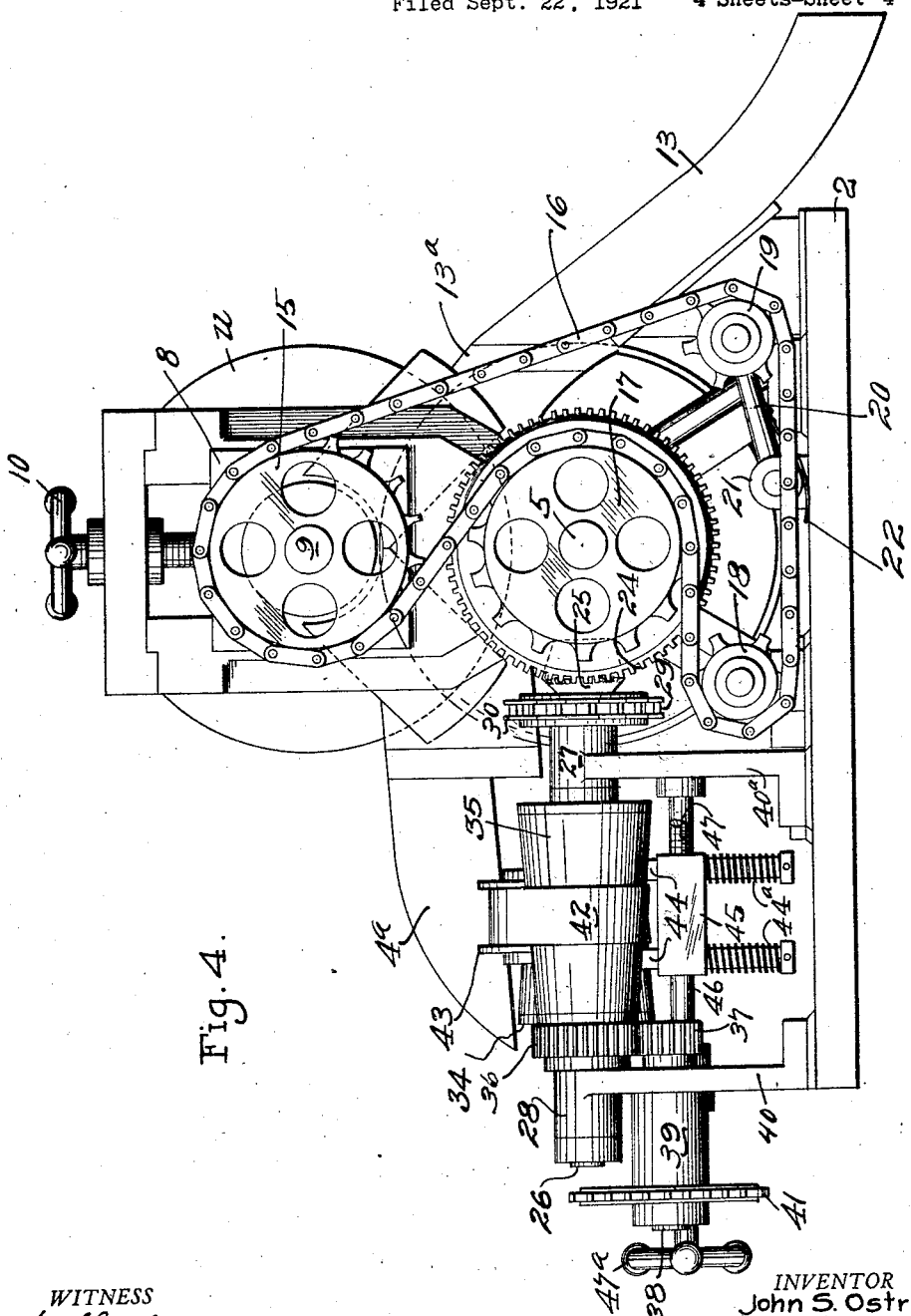
Fig. 4 is a rear elevation.

More specifically, the machine has a suitable frame or bed 2, applicable to a supporting structure which may be the top of a wrapping machine not shown. Permanent or separable bearing brackets for different parts are provided on the bed, one of which is shown at 3 as carrying a feed or guide box having side flanges 4—4ª and a bottom 4ᵇ. The flange 4 is cut away at its inner end in an arc 4ᶜ which is complementary to the rim of a rotary shaping member in the form of a short cylindrical roller L having a flange $l$ on one side only. This flange and the end of the box flange 4 are in a common plane and the inner end of the bottom 4ᵇ extends along the flange $l$ and is tangential to the roller body L, as seen in Fig. 3.

Figure 1:
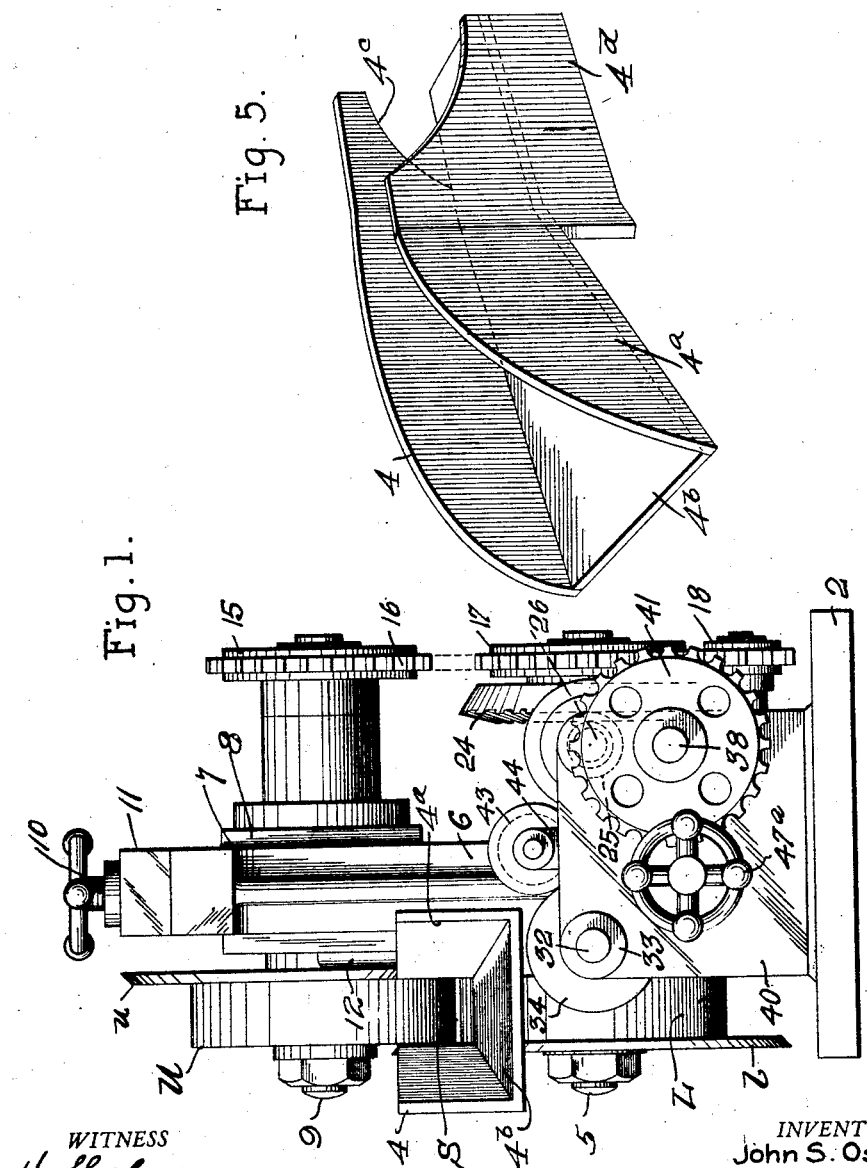
Fig. 1 is an elevation of the feed end of the machine.
Figure 2:
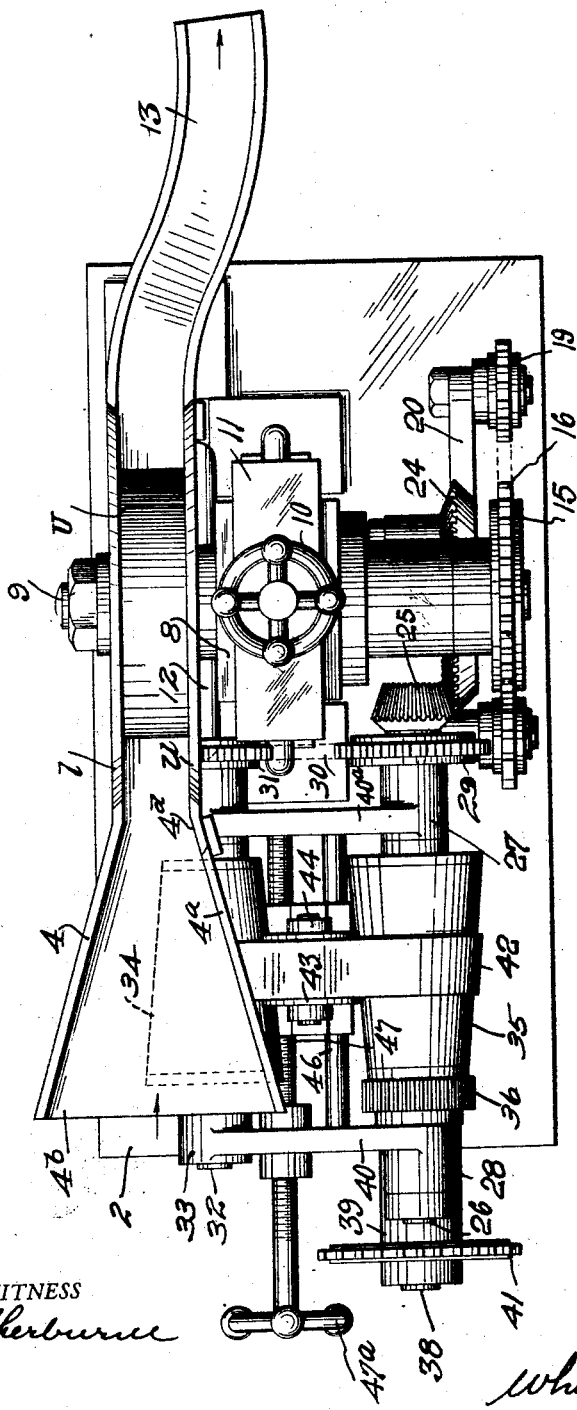
Fig. 2 is a plan of the machine.

The lower roller L is secured on a shaft 5 journaled in a pedestal bearing 6 which has an upper yoke part 7 forming a guide for an adjustable bearing block 8 in which is mounted a shaft 9 parallel to the lower shaft 5. On the shaft 9 is secured an upper roller U, having a cylindrical body as long as the lower roller L and having a flange $u$. The rollers are arranged in reverse positions so that the flange of one overlaps and bears on, the end of the body of the other; the flanges being of such diameter that the adjacent bodies of the rollers may be laterally separated to a desired degree before the flanges leave the opposing roller end. From this it will be seen that there may be formed between the rollers, a space having one dimension determined by the distance between the peripheries of the roller bodies, and another dimension determined by the distance between the flanges flanking the roller ends. This space S is shown in Fig. 1, as rectangular.

To vary one dimension of the roller space and thus to determine the cross-section of a string of candy stock advanced between the rollers from the feed box 4—4ª, suitable means are provided whereby the sliding block 8 may be shifted to raise or lower the shaft and its roller U. Such means may include a screw 10 rotatably mounted in a cap 11 on the yoke 7 and threaded into the upper end of the block 8.

Thus the rollers are relatively separable to open or close the gate or space S through which the candy must pass and be formed or rolled by the rollers L and U. The roller L being non-shiftable, the wall 4 rests close to the flange $l$, but as the roller U is shiftable it is desirable to provide a movable end piece 4ᵈ in the plane of the flange $u$ and of the wall 4ª, so that as the flange $u$ lifts along the end of the roller body L, no lateral opening will be formed. The end piece 4ᵈ has a curved edge proximate to the flange $u$ of the upper roller U and is attached by a plate 12 to the near side of the block 8 and will be adjustable with and by the block.

A somewhat similar box or discharge chute 13 is provided on the bed 2 and at the opposite face of the rollers to receive and guide the shaped string to a suitable point, as to the subadjacent wrapping mechanism when the present molding machine is so adapted. This box is also provided with a movable end wall 13ª in the plane of the shiftable flange $u$, and is movable by the block 8 to which it is attached.

The rollers are driven by suitable means so that their adjacent effective surfaces run in the same direction. An effective drive means includes a sprocket wheel 15, secured on the shaft 9, which is engaged by a sprocket chain 16 passing tangentially from the bottom of the wheel 15 to the top of a lower sprocket wheel 17, thence half around the wheel and off to an idler 18. From the idler the chain runs to and around a tension pulley 19 and then back to the upper wheel 15. The pulley 19 is mounted on a swinging lever or arm 20 pivoted on a support 21 and yieldingly controlled by a spring 22 which acts to hold the chain 16 tight, but yields when the upper wheel 15 is adjusted away from the lower wheel 17.

The wheel 17 is secured on shaft 5, journaled in the frame 6, and this is driven by a bevel gear 24 meshing with a pinion 25 secured on a jack spindle 26 arranged in bearings 27—28.

While power may be transmitted to the shaft 26 in any desired manner, it is preferable that means be employed providing for a ready and ample variation in the speed or rotation of the forming rollers L and U, as is found in practice to be necessary, because of the great difference in the viscosity of different stocks or batches of candy in bulk.

To secure such change of speed, a transmission is shown as including a sprocket pinion 29, secured on the spindle 26, meshing with a chain 30 which passes around a wheel 31 secured on a shaft 32 parallel to the spindle 26 and mounted in bearings 33, below the feed box 4—4ª. On the shaft 32 is fixedly provided a conical pulley 34 and loosely mounted on the spindle 26, is a similar, but reversely disposed, conical pulley 35, having on one end a spur gear 36, which meshes with a smaller pinion 37 rigid with a counter-shaft 38 mounted in a boss-bearing 39 of a bracket 40.

The counter-shaft may be driven by any desired means and is shown as provided with a sprocket wheel 41 which is driven by a chain, not shown, connected to a driver, for instance, forming a part of a wrapping machine.

Power is transmitted from the driving cone 35 to the driven cone 34 by means of a belt 42 which is associated with a tension and shifting device including a small spool-pulley 43, journaled in a traveler arranged between the cones and having posts 44 vertically slidable in a nut 45 shiftable along parallel rod and screw members 46—47 extending from the bracket 40 to bracket 40ª, which carries the bearings 27—33. The screw 47 has at one end a hand wheel 47ª by which it may be rotated and thereby shift the nut and with it the spool-pulley overlying the belt 42, which, moving toward the smaller end of the driver, decreases the speed of the shaft 32 and, when moving oppositely, increases the speed of the shaft 32.

Tension of the belt is maintained by yieldingly mounting the spool-pulley. This is accomplished as by confining expansion springs 44ª around the lower ends of the rods 44, for the function of pulling the pulley 43 down in the belt.

From the above it will be seen that a plastic bar or hank of candy can be worked into the feed box 4—4ª and when subjected to the drawing action of the contiguous faces of the rollers L—U, will be accurately and rapidly pressed into a string of the desired cross-section, which is easily secured by the relative lateral adjustment of the rollers. Since there is an obvious separating motion of points of the rollers from the proximal location as they pass the plane in which their axes are parallel, this facilitates clearance and prevents sticking of the candy in the gate so that a uniform string or bar of the candy passes from the shaping roller directly into the discharge guideway.

I claim:

1. In a machine for shaping plastic material, a pair of rollers arranged on parallel axes, means for varying the opening between the rollers, a stationary guide leading to the opening, and a wall section for the guide arranged at the side thereof and adjacent the end of the rollers, said section being mechanically connected to the varying means, whereby the position of the wall section is adjusted simultaneously with the opening.

2. In a machine for shaping plastic material, a roller, a member with which the roller cooperates to define an opening, means for adjusting the position of the roller so as to vary the size of the opening, a guide leading to the opening, and a wall section for the guide arranged at the side thereof and adjacent the end of the rollers, said section being mechanically connected to the adjusting means, whereby the position of the wall section is adjusted simultaneously with the opening.

3. In a machine for shaping plastic material, a pair of rollers arranged on parallel axes, means for varying the opening between the rollers, and a stationary guide chute leading to the opening, said chute having an adjustable wall section arranged at the side of the chute and adjacent the end of the rollers, whereby the chute may define a guide the walls of which form a substantially uninterrupted surface with the edges of the rolls for any relative adjustment thereof.

4. In a machine for shaping plastic material, a roller, a member with which the roller cooperates to define an opening, means for adjusting the position of the roller so as to vary the size of the opening, a chute having a side wall adjacent the end of the rollers, said chute forming a guide to the opening, said wall being shaped to fit the periphery of the roller and adjustable so that it may be maintained close to the roller for any adjusted position thereof.

5. In a machine for shaping plastic material, a stationary roller, a parallel adjustable roller forming with the stationary roller an adjustable opening, an overhanging flange on the adjustable roller in proximity to the edge of the stationary roller, an adjustable bearing block for supporting the adjustable roller, and a chute forming a guide to the opening, said chute having an adjustable side wall in substantially the same plane as the overhanging flange and mechanically connected to the bearing block.

In testimony whereof, I have hereunto set my hand.

JOHN S. OSTROM.